United States Patent [19]
Fu et al.

[11] Patent Number: 5,844,698
[45] Date of Patent: Dec. 1, 1998

[54] DOCUMENT SCANNER WITHOUT PRESSURE ACTUATED MECHANICAL DOCUMENT SENSOR AND DOCUMENT SCANNING METHOD THEREOF

[75] Inventors: Ying-Che Fu; Phil Wei-Ming Su, both of Taipei, Taiwan

[73] Assignee: Acer Peripherals, Inc., Taoyuan, Taiwan

[21] Appl. No.: 781,283

[22] Filed: Jan. 10, 1997

[51] Int. Cl.$^6$ ........................................................ H04N 1/04
[52] U.S. Cl. ............................ 358/488; 358/496; 358/498
[58] Field of Search ..................................... 358/488, 498, 358/496, 474, 486, 413, 494, 401; 271/4.1, 10.01, 10.11, 109

[56] References Cited

U.S. PATENT DOCUMENTS

| | | | |
|---|---|---|---|
| 4,812,917 | 3/1989 | Suzuki | 358/451 |
| 5,673,126 | 9/1997 | Ando | 358/488 |
| 5,699,165 | 12/1997 | Suzuki et al. | 358/488 |

FOREIGN PATENT DOCUMENTS 40 16 954 C2  8/1993  Germany .

3-99581  4/1991  Japan .

*Primary Examiner*—Edward L. Coles
*Assistant Examiner*—Cheukfan Lee

[57] ABSTRACT

A document scanner includes a roller to drive the document along a forward path, an image sensor arranged adjacent to the roller to scan the image on the document, and a control unit instructing the operations of the roller and the image sensor. The roller has an outer surface extending in an axial direction on which a plurality of interleaved black and white sections are arranged in a predetermined pattern and having a predetermined axial length. There is also provided a document scanning method associated with the structure of the document scanner, including the steps of (a) actuating the image sensor to perform the sensing operation toward the gray level pattern, storing the gray level value obtained from the sensing operation as the REFERENCE value; (b) actuating the image sensor to periodically perform the sensing operation toward the image viewed by the image sensor so as to obtain the CURRENT value; (c) initiating the scanning operation of the image sensor and the rolling movement of the roller when the CURRENT value and the REFERENCE value are substantially different; terminating the scanning operation of the image sensor and the rolling movement of the roller when the CURRENT value and the REFERENCE value are substantially the same.

15 Claims, 5 Drawing Sheets

DOCUMENT SCANNER WITHOUT PRESSURE ACTUATED MECHANICAL DOCUMENT SENSOR AND DOCUMENT SCANNING METHOD THEREOF

FIELD OF THE INVENTION

The present invention relates to a media scanning apparatus and in particular to a document scanner and the scanning method thereof without using a pressure actuated mechanical document sensor.

BACKGROUND OF THE INVENTION

The media scanning apparatus like document scanners or facsimile machines are usually provided with a document sensor to detect whether a document inserted before the scanning operation is performed. Some document sensors adapted in the scanners are pressure actuated. Namely, the document sensors are actuated by being applied thereon a force or pressure having a magnitude greater than a predetermined value, otherwise the sensor is not actuated. Due to such reason, if the document fed into the scanner does not induce a sufficient force applied on the document sensor, the scanner won't recognize there is a document to be scanned and thus no scanning operation is initiated. Further, incorporating a document sensor into the scanner complicates the wiring configuration and the arrangement of the parts of the scanner and thus increases the cost of the scanner.

FIG. 4 of the accompanying drawings schematically illustrates the structure of a conventional document scanner. The conventional scanner comprises a casing 1 having an inlet 13 for the entry of a document to be scanned (not shown) and an opposite outlet 16 for conveying the document out of the scanner. Inside the casing 1 and located between the inlet 13 and the outlet 16, a document driving roller 12 is provided to drive the document from the inlet 13 toward the outlet 16. A scanning member or image sensor 11 is provided adjacent to the roller 12 so that when the document is driven by the roller 12 to move along the document path 19, the document passes the image sensor 11 to allow the image thereof to be read by the image sensor 11. A pair of inlet guide plates 14 and 15 respectively located above and below the inlet 13 to guide the document to the roller 12. Similarly, a pair of outlet guides 17 and 18 are provided above and below the outlet 16 respectively to guide the document out.

A document sensor 10 is provided on the lower inlet guide plate 15. When a document is fed into the inlet 13, the document applies certain force upon the document sensor 10 to actuate the sensor 10 to initiate the scanning operation.

Referring to FIG. 5, the control unit 63 in a conventional scanner uses the document sensor 61 to detect whether the document inserted into the scanner or not. Depending on the result, the control unit 63 initiates a scanning operation of the image sensor 65 and a rolling movement of the roller 67, or stops the scanning operation of the image sensor 65 and the rolling movement of the roller 67. If the document does not apply a sufficient force to actuate the document sensor 10, then no scanning operation is actuated.

SUMMARY OF THE INVENTION

Referring to FIG. 6, the roller 75 is provided with a gray level pattern of plurality of interleaved black and white sections covering on the outer surface. (a) The control unit 73 actuates the image sensor 71 to perform sensing operation toward the gray level pattern, and stores the gray level value obtained from the sensing operation as the REFERENCE value. (b) The first and second threshold values are calculated from the REFERENCE value, and stored in the control unit memory 79. (c) When the scanner enters the SCANNING MODE, the control unit actuates the image sensor 71 to periodically perform sensing operation toward the image viewed by the image sensor to obtain the CURRENT value. (d) When the difference 77 between the CURRENT value and the REFERENCE value is greater than the first threshold value, then the control unit 73 initiates the scanning operation of the image sensor 71 and a rolling movement of the roller 75. (e) When the difference between the CURRENT value and the REFERENCE value is smaller than the second threshold value, the control unit 73 terminates the scanning operation of the image sensor 71 and the rolling movement of the roller 75.

The principal object of the present invention is to provide a document scanner that is not mechanically actuated by the conventional document sensor.

It is another object of the present invention to provide a document scanner that needs no mechanical document sensor to simplify the overall structure and cut down the overall cost.

A further object of the present invention is to provide a method for optically determining if a document inserted into a document scanner so that no mechanical document sensor is needed in the document scanner.

It is yet another object of the present invention to provide a method for determining if a document inserted into a document scanner and for starting the scanning operation of the document scanner.

BRIEF DESCRIPTION OF THE DRAWINGS

The present invention will be better understood from the following description of a preferred embodiment thereof, with reference to the attached drawings, wherein.

DETAILED DESCRIPTION OF THE PREFERRED EMBODIMENT

In this specification, the "sensing operation" means the image sensor reading an image pattern, and the control unit generating the gray level value of that pattern. The "scanning operation" means the image sensor reading an image pattern, and the data of that image pattern is transferred to the computer for further processing or output.

Figure 1:
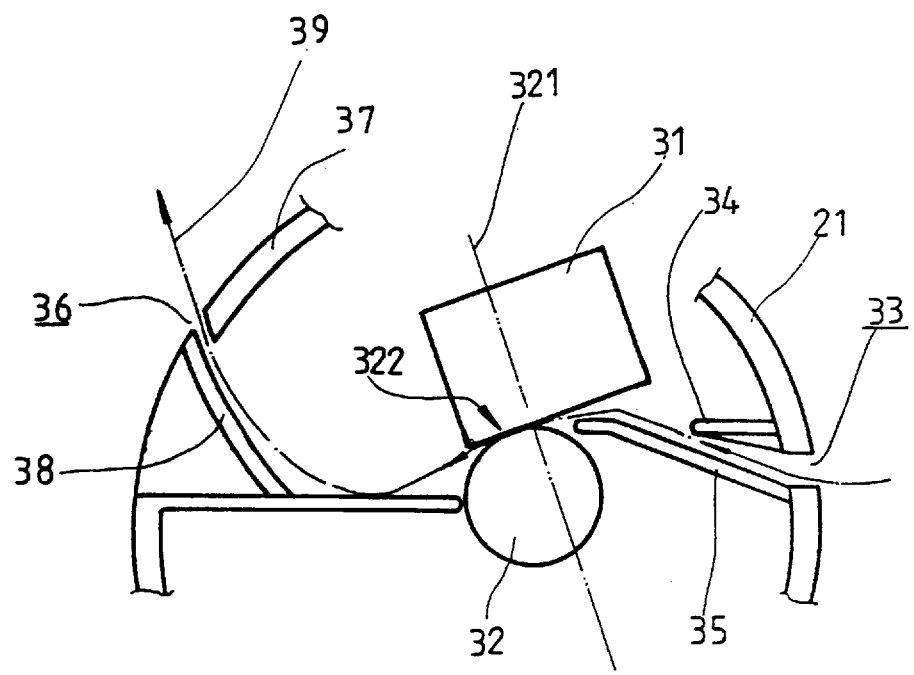
FIG. 1 is a schematic view showing a document scanner constructed in accordance with the present invention.

With reference to the FIG. 1, the document scanner of the present invention comprises a casing inside which a document driving roller 32 that is driven by for example a motor (not shown) to rotate around a rotation axis (not shown) and an image sensor 31 is located. The casing comprises a document inlet 33 having a pair of guide plates 34 and 35 located within the casing and respectively arranged above and below the inlet 33 for guiding a document (not shown) fed into the document scanner through the inlet 33 to the roller 32. When the document is manually inserted into the document scanner, the lower guide plate 35 guides the document to the roller 32. Due to its rotation, the roller 32 drives the document forward and toward a document outlet 36 formed on the casing. Preferably, the outlet 36 comprises a lower guide plate 38 that guides the document driven by the roller 32 from the roller 32 to the outlet 36. An upper guide 37 may also be provided above the outlet 36.

The lower guide plate 35 of the inlet 33 and the lower guide plate 38 of the outlet 36, together with the roller 32, define a document path 39 along which the document to be scanned moves through the scanner.

The scanner also comprises a control unit (not shown), such as a micro-processor based controller to control the operation of the scanner.

The image sensor 31 is arranged adjacent to the roller 32, the image sensor having a field of view directed toward the roller and can periodically generating an electrical signal representative of a image viewed by the image sensor. The image sensor 31 and the roller 32 also define therebetween a contact zone 322 through which the document is driven by the roller 32, and a scanning line 321 is located upstream of the contact zone 322. The image presented on the document is being scanned while passing the scanning line 321.

Figure 3:
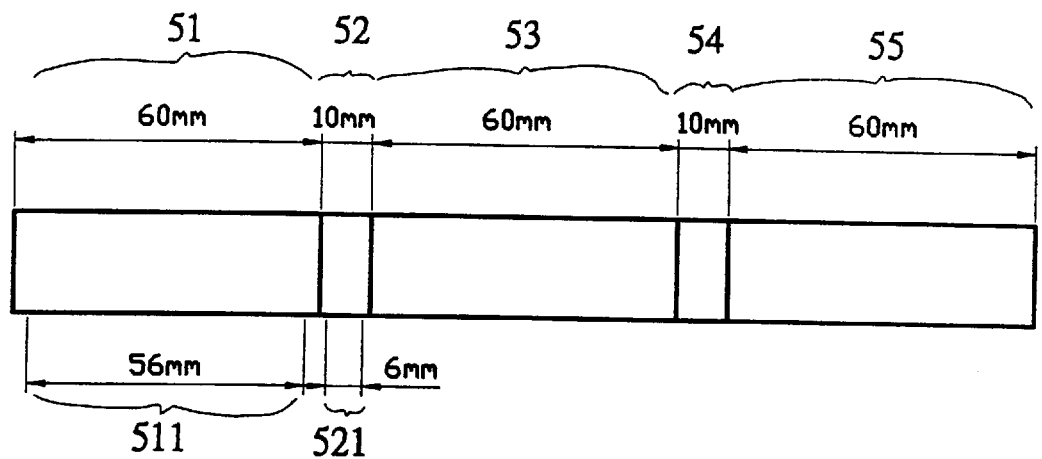
FIG. 3 shows an example of the black-and-white alternating pattern presented on the document driving roller in accordance with the present invention.
Figure 2:
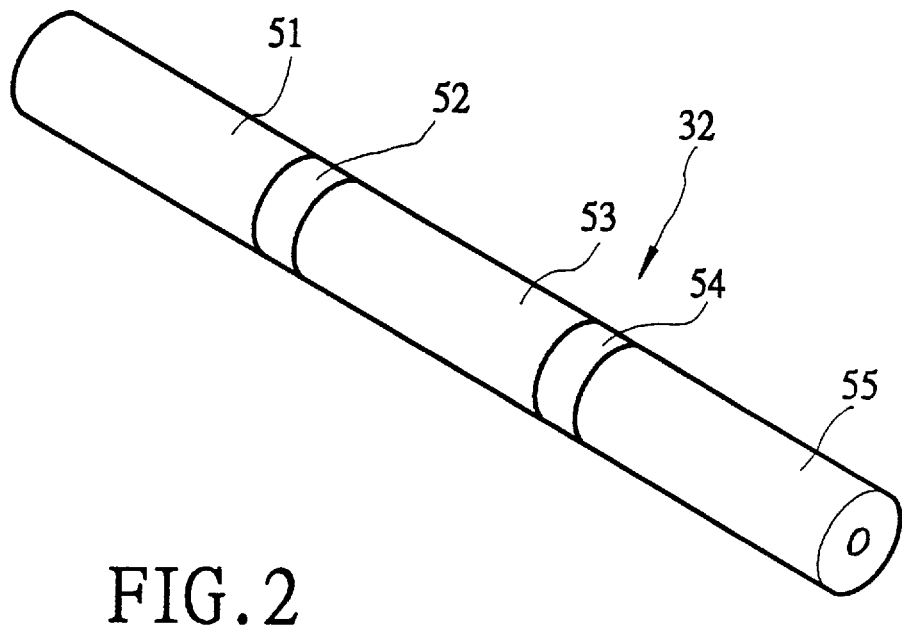
FIG. 2 is a perspective view showing the document driving roller constructed in accordance with the present invention, on which a black-and-white alternating pattern is presented.
Figure 4:
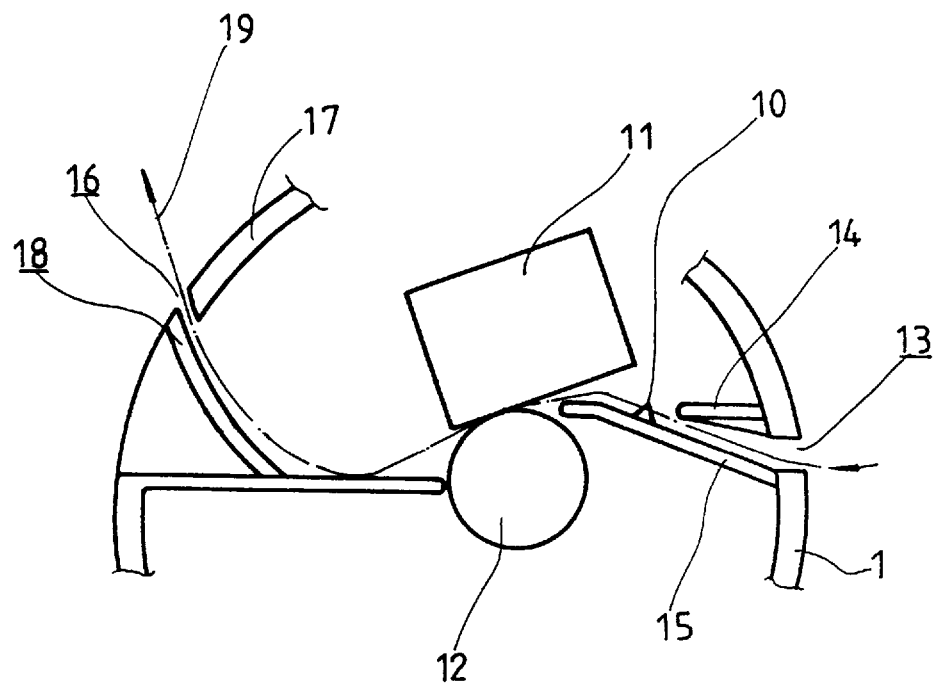
FIG. 4 is a schematic view showing a conventional document scanner.
Figure 5:
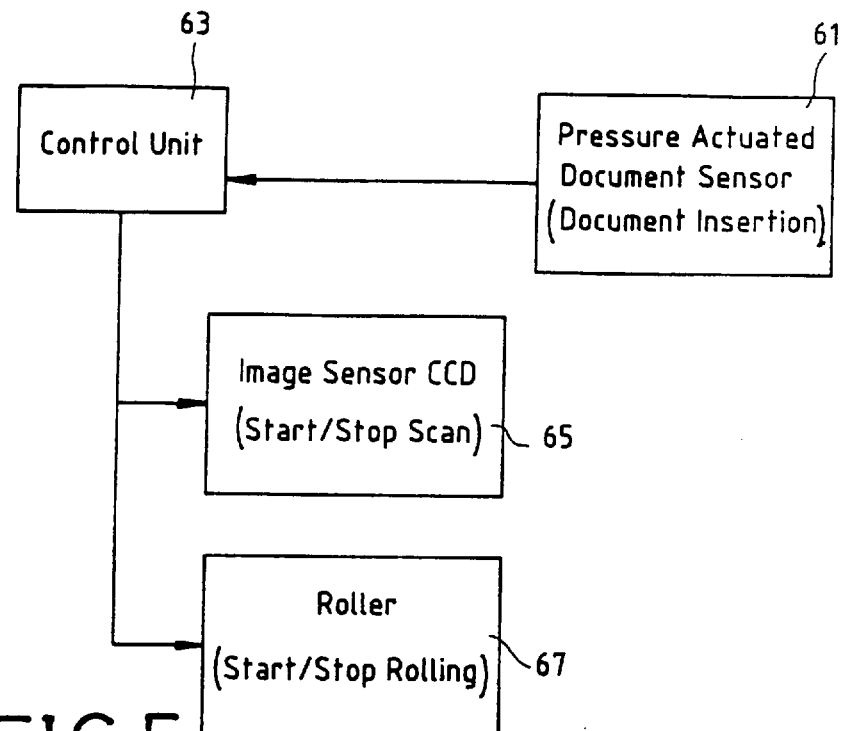
FIG. 5 is a block diagram of the conventional document scanner.
Figure 6:
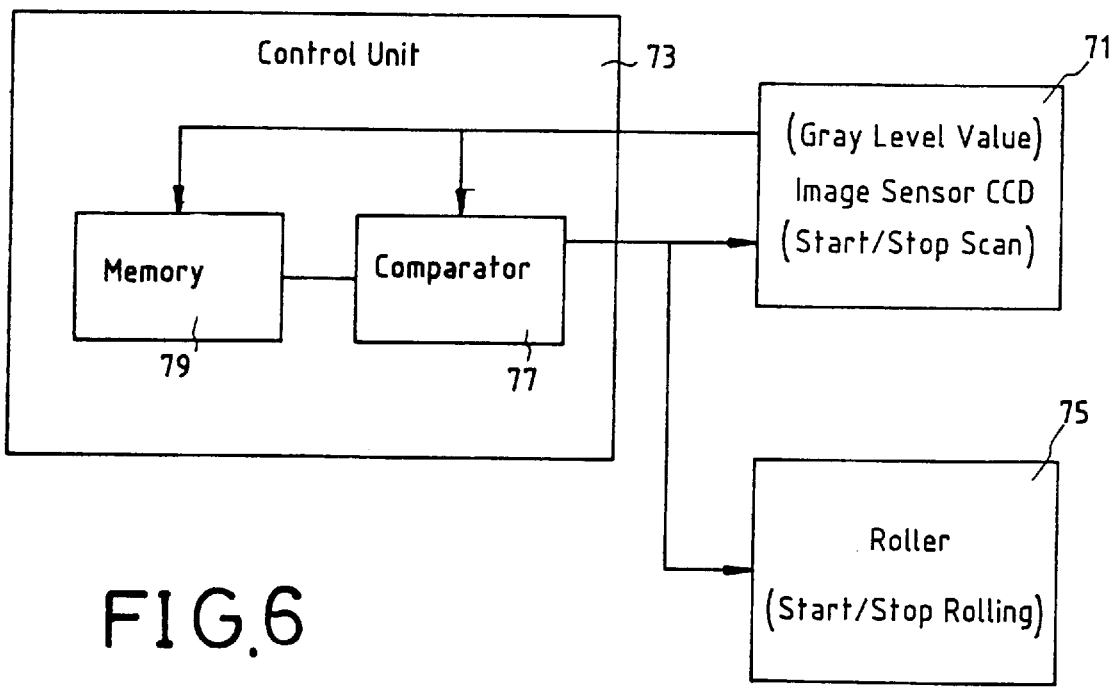
FIG. 6 is a block diagram of a preferred embodiment of present invention.

In accordance with the present invention, a gray level pattern with at least one black section and/or at least one white section is provided on the outer surface of the roller 32. The roller is rotatable to feed in the document, and the document will overlay the gray level pattern when the document is fed in. FIGS. 2 and 3 illustrate an example of gray level pattern comprised of interleaved black and white ring sections, which comprises three black ring sections 51, 53, and 55 with two white ring sections 52 and 54 along the axial direction of the roller 32. In the illustrated preferred embodiment, the black ring sections 51, 53 and 55 have the same axial length as 60 mm. Similarly, both the white ring sections 52 and 54 have the same axial length as 10 mm. It should be noted that the axial length and arrangement of these ring sections may be different. For example, there may be only one white section covering the whole surface of the roller 32 and no black section at all, or vice versa.

Figure 7:
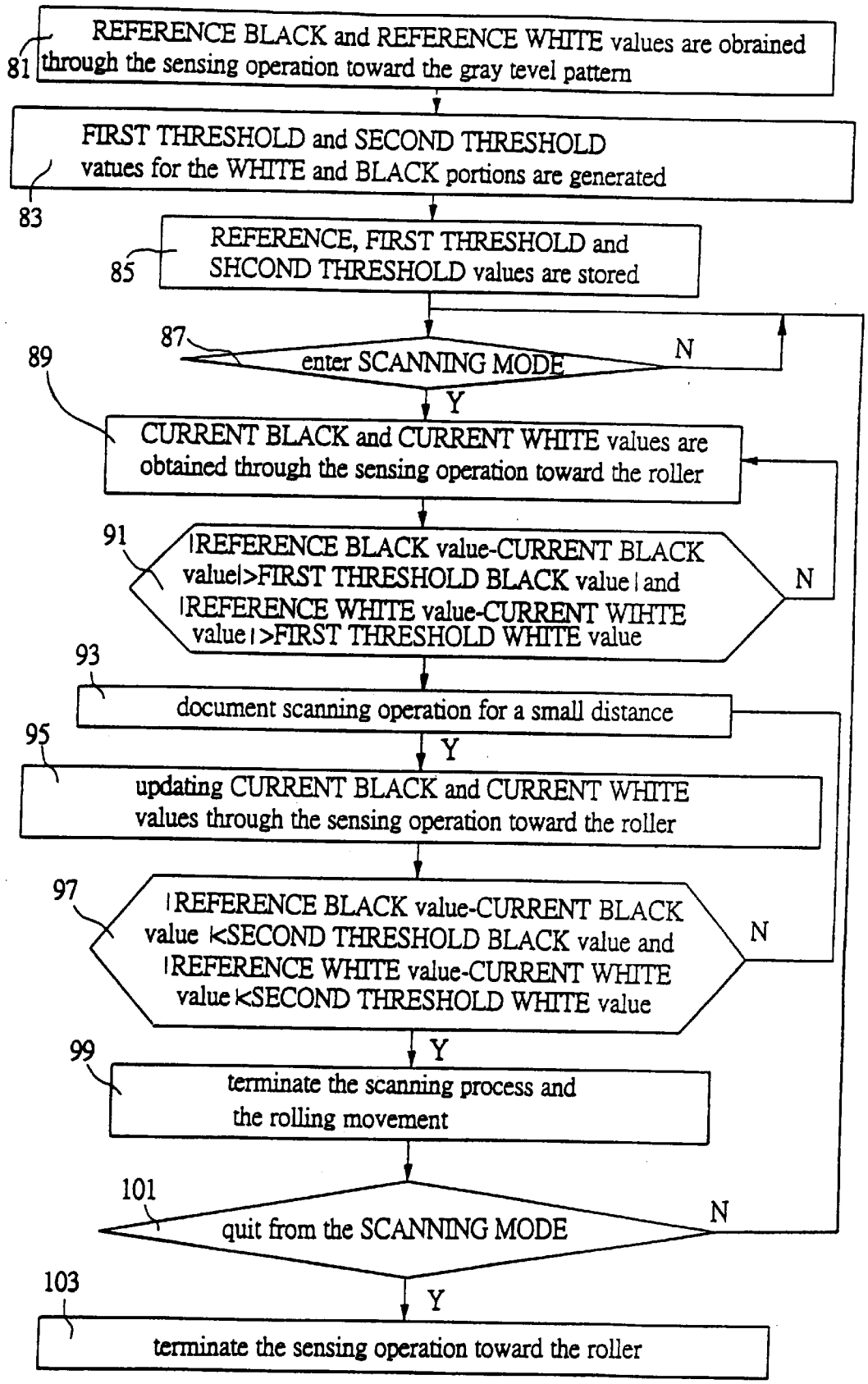
FIG. 7 is a flow chart illustrating the method of the present invention.

The detailed flow process is illustrated as follows by referring to FIGS. 1 and 7 which are a schematic view showing the structure the document scanner of the present invention and a flow chart illustrating the method of the present invention.

In flow process 81, as the gray level pattern is viewed by the image sensor, the image sensor 31 performs a sensing operation toward these black and white sections 51–55, and then stores the gray level values with respect to these black and white sections as a REFERENCE BLACK value and a REFERENCE WHITE value respectively. The REFERENCE BLACK value is obtained by summing up the gray level value of all black sections 51, 53 and 55, and the REFERENCE WHITE value is obtained similarly by summing up the gray level value of all white sections 52 and 54. In the preferred embodiment, the image resolution of the scanner is set to 200 dpi (dot per inch), and the gray level is set to 64 levels. It takes the control unit to sum up the gray level values of about 400 pixels for the 56 mm middle portion 511 of black section 51 in FIG. 3.

To improve the accuracy of the sensing operation, only the gray level value of middle portion of each black and white sections 51–55 is taken into the REFERENCE value calculation. Neglecting the margin portions in calculation, it allows some position misalignment error existing between the roller 32 and the image sensor 31. For example, the axial length of the black section 51 is 60 mm, and only the gray level value of the 56 mm middle portion 511 is taken into the calculation of REFERENCE BLACK value. Namely, 2 mm margins on both sides (along axial direction) are neglected in the sensing operation. Similarly, the axial length of the white section 52 is 10 mm, and only the gray level value of the 6 mm middle portion 521 is taken into the calculation of REFERENCE WHITE value.

In the present invention, the FIRST THRESHOLD BLACK value is defined as 10% of the REFERENCE BLACK value, and the SECOND THRESHOLD BLACK value is defined as 7% of the REFERENCE BLACK value. Similarly, the FIRST THRESHOLD WHITE value and the SECOND THRESHOLD WHITE value are also generated from the REFERENCE WHITE value by similar definition. In flow process 83, all the first threshold and second threshold values for BLACK and WHITE sections are generated. In flow process 85, all the THRESHOLD values and the REFERENCE values are stored in the control unit.

In the flow process 87, the scanner may enter the SCANNING MODE responsive to the user's instruction. In the SCANNING MODE, the scanner should be ready to perform immediately a document scanning operation responsive to the document insertion. Therefore the control unit should keep periodically detecting whether any document inserted in the SCANNING MODE.

In the flow process 89, the image sensor 31 periodically performs a sensing operation toward the image viewed by the image sensor, and the control unit periodically generating a CURRENT value representative of a image viewed by the image sensor. Following same calculation respect to same portions (2 mm–58 mm for BLACK, and 62 mm–68 mm for WHITE) defined in the calculation of the REFERENCE value, the control unit obtains a CURRENT BLACK value and a CURRENT WHITE value.

In the flow process 91, if there is no document inserted into the scanner, then the CURRENT values sensed by the image sensor 31 should be close to the REFERENCE values of the gray level pattern formed on the outer surface of the roller 32; otherwise, the CURRENT values representing the gray level value of the document should be substantially different from the REFERENCE values. Depending on the difference between the CURRENT values and the REFERENCE values, the control unit determines whether a document is inserted or not.

if (|REFERENCE BLACK value−CURRENT BLACK value|>FIRST THRESHOLD BLACK value) and (|REFERENCE WHITE value−CURRENT WHITE value|>FIRST THRESHOLD WHITE value) then the control unit activates the flow process 93; otherwise, the control unit will restrict the scanner operated in the loop of flow process 89 and 91.

In the flow process 93, the roller 32 is actuated to drive the document moving forward for several scanning lines along the path 39. At the same time, the image sensor 31 performs the document scanning operation to receive the image data on the document.

In the flow process 95, the control unit keeps sensing the gray level value toward the image viewed by the image sensor to periodically update the CURRENT values.

In the flow process 97, if the end of document has passed the scanning line, then the CURRENT values sensed by the image sensor 31 should be substantially the same as the REFERENCE values of the gray level pattern formed on the outer surface of the roller 32; otherwise, the CURRENT values representing the gray level value of the document should still be substantially different from the REFERENCE values. Depending on the difference between the CURRENT values and the REFERENCE values, the control unit determines whether the end of a document is reached or not.

if (|REFERENCE BLACK value−CURRENT BLACK value|<SECOND THRESHOLD BLACK value) and (|REFERENCE WHITE value−CURRENT WHITE value|<SECOND THRESHOLD WHITE value) then the control unit activates the flow process 99; otherwise, the control unit will keep the scanner performing the scanning operation in the loop of flow process 93, 95, and 97.

In the flow process 99, the control unit determines that the document has been completely scanned, and the control unit terminates the scanning operation of the image sensor 31 and the rolling movement of the roller 32.

In the flow process 101, the scanner may quit from the SCANNING MODE responsive to the user's instruction. If the scanner does quit from the SCANNING MODE, then the scanner is unnecessary to keep detecting the document insertion and enters the flow process 103. In the flow process 103, the control unit terminates the periodically sensing operation toward the image viewed by the image sensor.

On the other hand, if the scanner is still operating in the SCANNING MODE, then the control unit will execute the flow process 89 and keep periodically sensing operation toward the image viewed by the image sensor.

To sum up, the control unit performs two comparison in the flow to instruct the image sensor selectively initiates and terminates the scan operation of the image. In flow process 89–93, if the CURRENT value is substantially different from the REFERENCE value, then the control unit will initiate the scan operation of the image. In flow process 95–99, if the CURRENT value is substantially the same as the REFERENCE value, then the control unit will terminate the scan operation of the image.

Although a preferred embodiment has been described to illustrate the present invention, it is apparent that changes and modifications in the specifically described embodiment can be carried out without departing from the scope of the invention that is intended to be limited only by the appended claims. For example, the purpose of establishing a SCANNING MODE in the scanner operation is to prevent the scanner from performing unnecessary sensing operation for CURRENT values, and to save the power consumption of scanner. One possible alternative modification may be designing a scanner without a SCANNING MODE, and the image sensor keeps sensing the CURRENT values whenever the scanner is power on.

What is claimed is:

1. A media scanning apparatus for performing scan operation of an image on the media, comprising:
   a roller with a gray level pattern formed on an outer surface of the roller, the roller being rotatable to feed in the media, when the media is being fed in, the media overlaying the gray level pattern;
   an image sensor located adjacent to the roller, the image sensor having a field of view directed toward the roller and periodically generating an electrical signal representative of a image viewed by the image sensor; and
   a control unit, coupled to the image sensor, for selectively initiates and terminates scan operation of the image, the control unit generating and storing a REFERENCE value as the gray level pattern is viewed by the image sensor, the control unit periodically generating a CURRENT value in response to the electrical signal, wherein the control unit initiates scan operation of the image when the CURRENT value generated is substantially different from the REFERENCE value.

2. The media scanning apparatus of claim 1, wherein the gray level pattern comprises a white section or a black section covering the outer surface of the roller.

3. The media scanning apparatus of claim 1, wherein the gray level pattern comprises a plurality of interleaved black and white ring sections disposed along an axial direction of the roller.

4. A method to control a media scanning apparatus, the media scanning apparatus comprising an image sensor, a control unit, and a roller with a gray level pattern formed on an outer surface of the roller, the method performed by the control unit comprising the steps of:
   (a) actuating the image sensor to generate a REFERENCE value in response to the gray level pattern viewed by the image sensor;
   (b) actuating the image sensor to periodically generating an electrical signal representative of a image viewed by the image sensor, so as to obtain a periodically updated CURRENT value; and
   (c) initiating a scanning operation of the image sensor and a rolling movement of the roller when the CURRENT value is substantially different from the REFERENCE value.

5. The method of claim 4, wherein the method performed by the control unit further comprising the step of:
   (d) terminating the scanning operation of the image sensor and the rolling movement of the roller when the CURRENT value is substantially the same as the REFERENCE value.

6. The method of claim 5, wherein a first and a second threshold values are calculated from the REFERENCE value, wherein the CURRENT value being substantially different from the REFERENCE value means a difference between the CURRENT value and the REFERENCE value is greater than the first threshold value, wherein the CURRENT value being substantially the same as the REFERENCE value means the difference between the CURRENT value and the REFERENCE value is smaller than the second threshold value.

7. The method of claim 6, wherein the first threshold value is defined as 10% of the REFERENCE value and the second threshold value is defined as 7% of the REFERENCE value.

8. The method of claim 6, wherein the first threshold value is the same as the second threshold value.

9. The method of claim 4, wherein the gray level pattern comprises only a white section or a black section covering the outer surface of the roller.

10. The method of claim 4, wherein the gray level pattern comprises a plurality of interleaved black and white ring sections disposed along an axial direction of the roller, so that the control unit calculates the REFERENCE value, the first threshold value, the second threshold value and the CURRENT value with respect to the black sections or white sections.

11. The method of claim 4, wherein the media scanning apparatus enters and quits a SCANNING MODE responsive to user's instruction, and the control unit performs steps (b), (c) of claim 4 in the SCANNING MODE.

12. A method to control a media scanning apparatus, the media scanning apparatus comprising an image sensor, a control unit, and a roller with a gray level pattern formed on an outer surface of the roller, the method performed by the control unit comprising the steps of:

(a) actuating the image sensor to perform a sensing operation as the gray level pattern is viewed by the image sensor, storing a gray level value obtained from the sensing operation as a REFERENCE value;

(b) storing a first threshold value and a second threshold value, wherein the first and second threshold values are calculated from the REFERENCE value;

(c) actuating the image sensor to periodically perform a sensing operation toward a image viewed by the image sensor so as to obtain a CURRENT value;

(d) initiating a scanning operation of the image sensor and a rolling movement of the roller when a difference between the CURRENT value and the REFERENCE value is greater than the first threshold value; and (e) terminating the scanning operation of the image sensor and the rolling movement of the roller when the difference between the CURRENT value and the REFERENCE value is smaller than the second threshold value.

13. The method of claim 12, wherein the first threshold value is defined as 10% of the REFERENCE value and the second threshold value is defined as 7% of the REFERENCE value.

14. The method of claim 12, wherein the first threshold value is the same as the second threshold value.

15. The method of claim 12, wherein the media scanning apparatus enters and quits a SCANNING MODE responsive to user's instruction, and the control unit performs steps (c), (d) of claim 12 in the SCANNING MODE.

* * * * *